(12) United States Patent
Barrow

(10) Patent No.: US 6,259,068 B1
(45) Date of Patent: *Jul. 10, 2001

(54) FOOD-HEATING APPLIANCE AND METHOD OF USING SAME

(75) Inventor: Mary Kathleen Barrow, Clinton, MO (US)

(73) Assignee: The Rival Company, Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/666,249

(22) Filed: Sep. 21, 2000

Related U.S. Application Data

(63) Continuation of application No. 09/313,793, filed on May 18, 1999.

(51) Int. Cl.[7] .............................. A47J 27/12; A47J 27/00
(52) U.S. Cl. ........................ 219/432; 219/433; 219/441; 99/367; 99/403
(58) Field of Search .................................. 219/432, 433, 219/429, 438; 99/367, 416, 448

(56) References Cited

U.S. PATENT DOCUMENTS

| | | |
|---|---|---|
| D. 395,787 | 7/1998 | Wilks . |
| D. 431,149 * | 9/2000 | Cooke et al. ............ D7/354 |
| 1,630,787 | 5/1927 | Cullen . |
| 2,372,978 | 4/1945 | Pelenberg . |
| 2,496,964 * | 2/1950 | Steinhauer ............... 220/552 |
| 2,515,617 * | 7/1950 | Tilford .................. 99/448 |
| 3,038,058 | 6/1962 | Gordon . |
| 3,720,807 | 3/1973 | Ting . |
| 3,908,111 | 9/1975 | Du Bois et al. . |
| 4,307,287 | 12/1981 | Weiss . |
| 4,646,628 | 3/1987 | Lederman . |
| 4,817,512 | 4/1989 | Vangen . |
| 4,866,235 | 9/1989 | Griffin et al. . |
| 5,274,215 | 12/1993 | Jackson . |
| 5,402,714 | 4/1995 | Deneault et al. . |
| 5,865,098 | 2/1999 | Anelli . |
| 6,035,766 * | 3/2000 | Schirmer ............... 99/448 |

* cited by examiner

*Primary Examiner*—Joseph Pelham
(74) *Attorney, Agent, or Firm*—Brinks Hofer Gilson & Lione; Frank Marino

(57) ABSTRACT

A food-heating appliance has a heating unit with a bottom and at least one upstanding sidewall, a heating chamber with an annular lip, and a heating element. A cooking unit is also provided with a bottom and at least one upstanding sidewall, a cooking chamber adapted to be at least partially received within the heating chamber, and a medial wall upstanding from the bottom wall defining at least a first and second cooking subchamber. The heating element supplies heat to the cooking unit via the heating chamber to heat the first and second cooking subchambers.

13 Claims, 5 Drawing Sheets

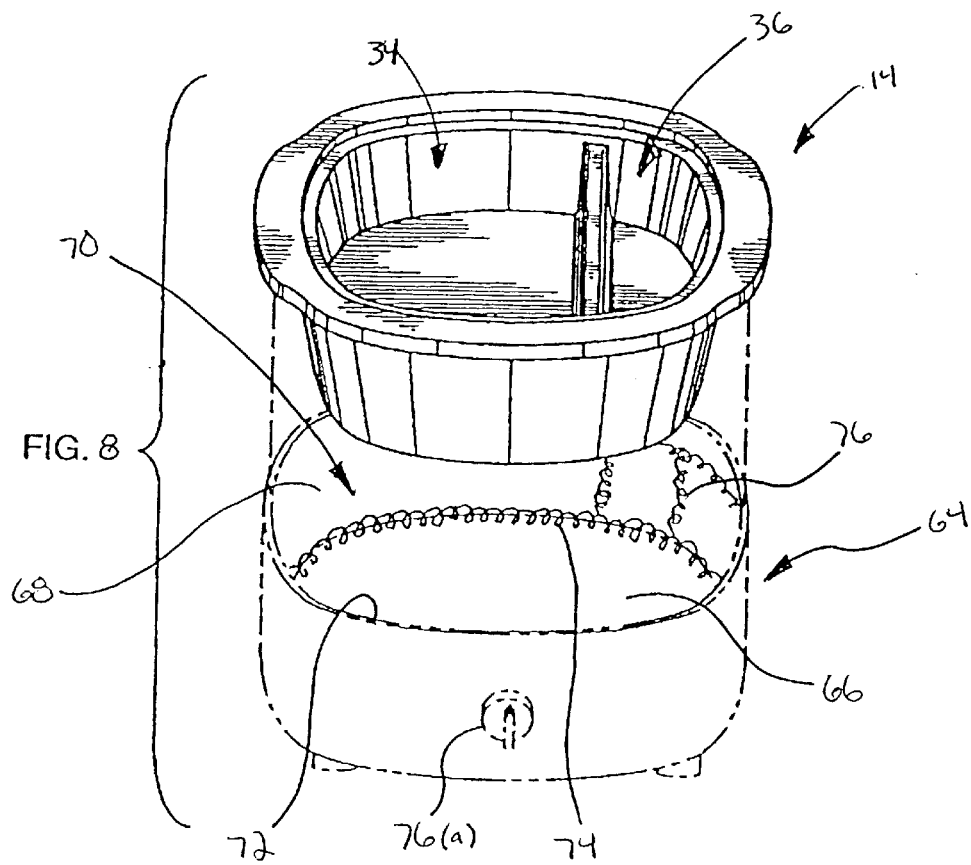
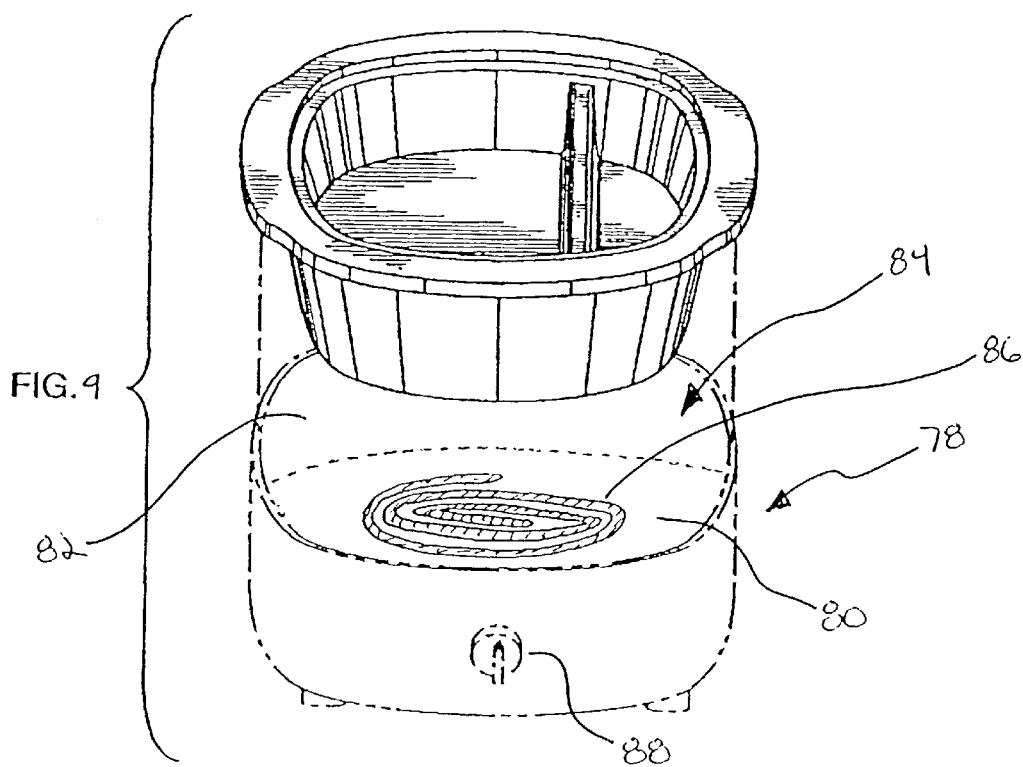

FOOD-HEATING APPLIANCE AND METHOD OF USING SAME

This application is a continuation of application Ser. No. 09/313,793, filed May 18, 1999, (pending).

BACKGROUND OF THE INVENTION

The invention relates to a food-heating appliance and more particularly to a food-heating appliance having a cooking unit insert with a plurality of cooking subchambers.

Conventional food-heating appliances have a heating unit and a cooking unit. The heating unit typically has a bottom heating area. Some units include a continuous sidewall upstanding therefrom to define a heating chamber. The sidewall is usually either circular or oval in cross-section. Such heating units have one or more electric heating elements mounted thereto that are adapted to supply heat to the cooking unit. One or more control switches, circuited to supply electricity, control the heating elements.

The cooking unit typically has a bottom with a continuous sidewall upstanding therefrom. The cooking unit has a flange-like lip extending from the upper side of the sidewall that is adapted to engage the upper surface of the heating unit sidewall when the cooking unit is placed therein. In some appliances, such as the Crock-Pot® slow cooker manufactured by The Rival Company, the cooking unit is made of ceramic and is adapted to work in conjunction with the heating unit to cook food products in a slow, uniform fashion.

The cooking of food products in the Crock-Pot® slow cooker is performed in a steady, even manner because the ceramic or "crockery" cooking unit conducts heat evenly within the cooking chamber. Furthermore, the ceramic sidewalls of the cooking unit conduct and hold heat for an extended period of time to level any fluctuations in temperature if the heating element in the heating unit cycles on and off. The cooking unit may be used as a heat-retaining serving container.

Such food-heating appliances, however, utilize cooking units with only a single heating chamber formed therein. This is a disadvantage when multiple food products are desired to be slow-cooked. In the past, if a consumer wished to slow-cook more than one food product, the consumer would have to purchase multiple food-heating appliances, which is undesirably costly to the consumer.

SUMMARY OF THE INVENTION

The invention includes a food-heating appliance including a heating unit defining a heating area. The heating area includes at least one heating element mounted to supply heat to the heating area and a control switch circuited to supply electricity to the heating element. A ceramic cooking unit is provided having a bottom and at least one sidewall that define a cooking chamber adapted to be at least partially received over the heating area. The cooking unit includes at least one medial wall to divide the cooking chamber into at least a first and second cooking subchamber. The heating element supplies heat to the cooking unit via the heating area to heat the first and second cooking subchambers.

In another aspect of the invention, the invention includes a food-heating appliance with a heating unit having a bottom and at least one sidewall upstanding therefrom, the bottom and sidewall defining a heating chamber and the sidewall defining an annular lip around the top of the chamber. The chamber includes at least one heating element mounted thereto and adapted to supply heat to the chamber, and a control switch circuited to supply electricity to the heating element. A cooking unit has a bottom and at least one sidewall upstanding therefrom, the bottom and sidewall defining a cooking chamber adapted to be at least partially received within the heating chamber and the sidewall defining an annular lip positionable over the annular lip of the heating unit. The cooking unit also has at least one medial wall upstanding from the bottom wall within the cooking chamber which defines a first and second cooking subchamber. The heating element supplies heat to the cooking unit via the heating chamber to heat the first and second cooking subchambers.

An advantage of the present invention is that two separate food items may be slow-cooked in separate first and second cooking subchambers within a single heating unit, thereby saving the expense of having to purchase multiple heating and cooking unit pairs.

According to an alternative embodiment to the present invention, the cooking chamber of the cooking unit has two medial walls defining three cooking subchambers therein.

These and other advantages of the invention will appear more fully from the following description in conjunction with the accompanying drawings, wherein like referenced characters refer to the same or similar parts throughout the several views.

BRIEF DESCRIPTION OF THE DRAWINGS

FIG. 8 is a third alternative embodiment of a food-heating appliance having a heating unit with an uneven heating coil distribution according to the present invention;

FIG. 9 is a fourth alternative embodiment of a food-heating appliance having a heating unit with a hot plate heat mechanism according to the present invention;

DESCRIPTION OF THE PREFERRED EMBODIMENT

Figure 1:
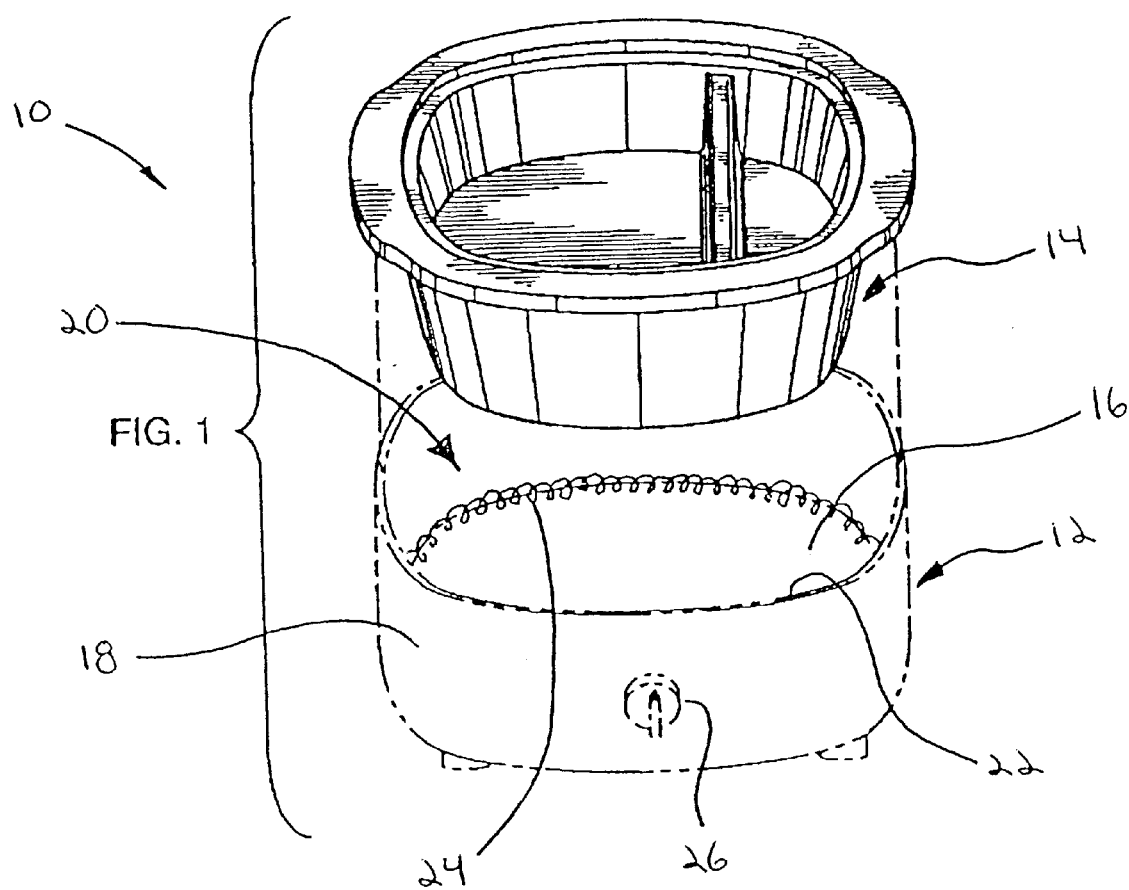
FIG. 1 is a perspective view of a food-heating appliance heating and cooking unit according to the present invention.
Figure 2:
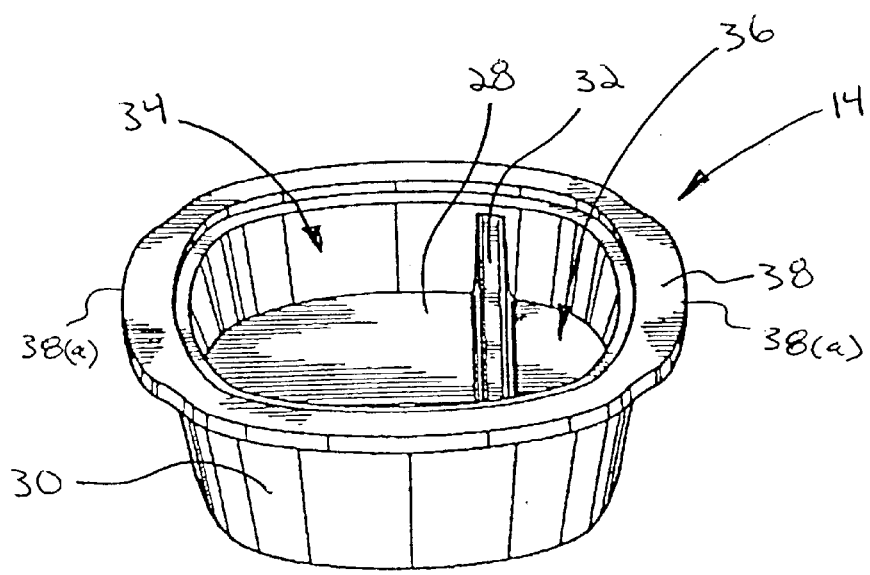
FIG. 2 is a perspective view of a food-heating appliance cooking unit according to the present invention.
Figure 3:
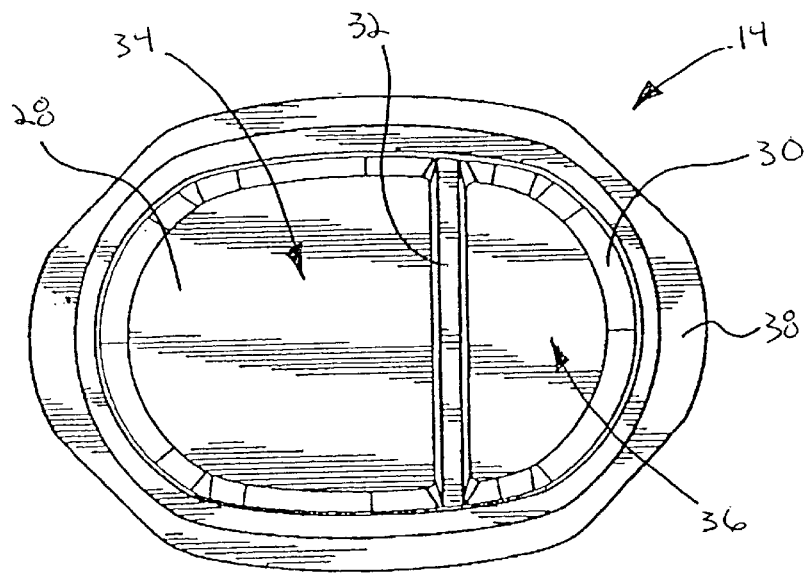
FIG. 3 is a top view of a food-heating appliance cooking unit according to the present invention.
Figure 4:
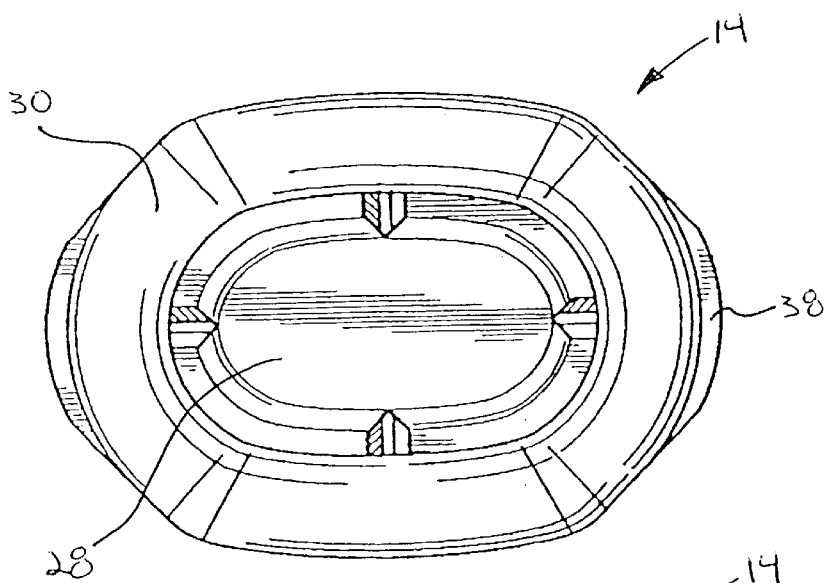
FIG. 4 is a bottom view of a food-heating appliance cooking unit according to the present invention.
Figure 5:
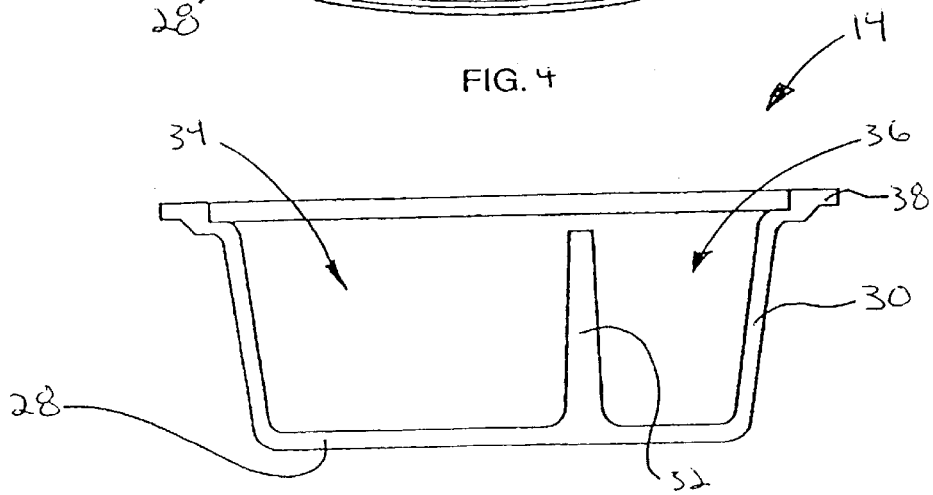
FIG. 5 is a cross-sectional view of a food-heating appliance cooking unit according to the present invention.

Referring now to FIG. 1, a food-heating appliance 10 comprises a heating unit 12 and a cooking unit 14. The heating unit 12 has a bottom 16 and preferably a continuous sidewall 18. The bottom 16 and sidewall 18 define a well-like heating chamber 20 having an oval cross-section, and the sidewall 18 defines an annular lip 22 at an upper edge of the sidewall 18. The heating chamber 20 has a heating element 24 disposed therein and mounted to the heating unit 12. A control switch 26 is circuited to supply electricity to the heating element 24. The heating element 24 functions to supply heat to the cooking unit 14 via the heating chamber 20. In the alternative, instead of a heating chamber 20, the heating unit 12 may include a bottom 16 which may or may not include a continuous sidewall 18. Thus, instead of defining a heating chamber 20, the heating unit 12 can define a heating area which contains a heating element substantially contained within the bottom portion of the heating unit 12.

As shown in FIGS. 2 through 5, the cooking unit 14 has a bottom 28 with preferably a continuous sidewall 30 upstanding therefrom. A medial wall 32 projects upwardly and inwardly from the respective bottom 28 and side walls 30, defining a first cooking subchamber 34 and a second cooking subchamber 36. The continuous sidewall 30 preferably has an annular lip 38 projecting in flange-like fashion from the upper end thereof and a substantially oval cross-section. The cooking unit 14 is adapted to at least be partially received within the heating unit 12 with the annular lip 38 of the cooking unit 14 preferably engaging the annular lip 22 of the heating unit 12, supporting the cooking unit 14 within the heating unit 12. Preferably, the annular lip 38 further defines a pair of handle portions 38(a) and 38(b) to facilitate lifting the cooking unit 14. The cooking unit 14 is preferably made of ceramic with a coating of conventional glazing compound.

The thermal and heat retaining properties of the ceramic cooking unit 14 allow the cooking unit 14 to conduct heat from the heating chamber 20 through the sidewall 30 and medialwall 32. This provides even heating throughout each of the cooking subchambers 34 and 36.

Figure 6:
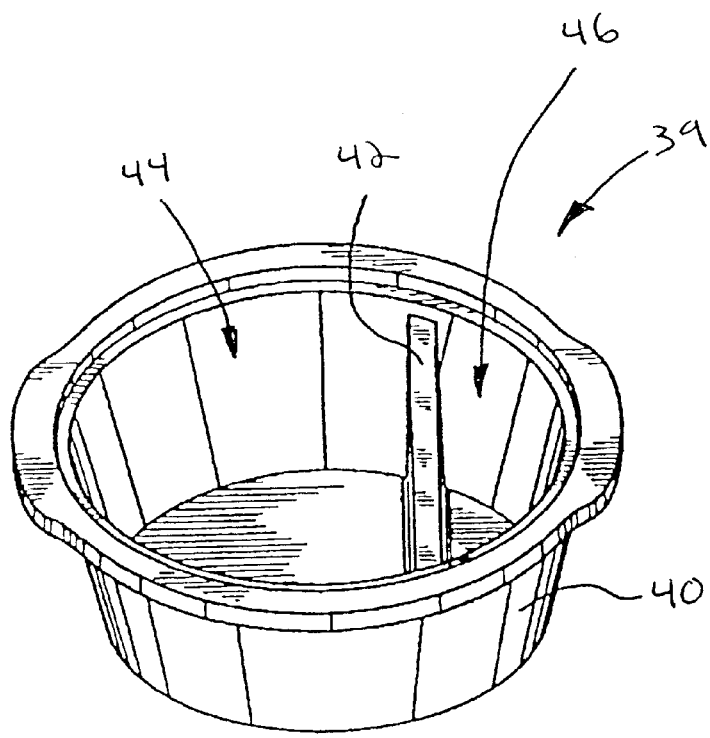
FIG. 6 is an alternative embodiment of a food-heating appliance having a cooking unit with a circular cross-section according to the present invention.

As shown in FIG. 6, an alternative embodiment of the cooking unit 39 has a sidewall 40 and a substantially circular cross-section. A medial wall 42 divides the cooking unit 39 into first and second cooking subchambers, 44 and 46, respectively. This embodiment is preferably adapted to fit within a heating unit having a complimentary circular heating chamber.

Figure 7:
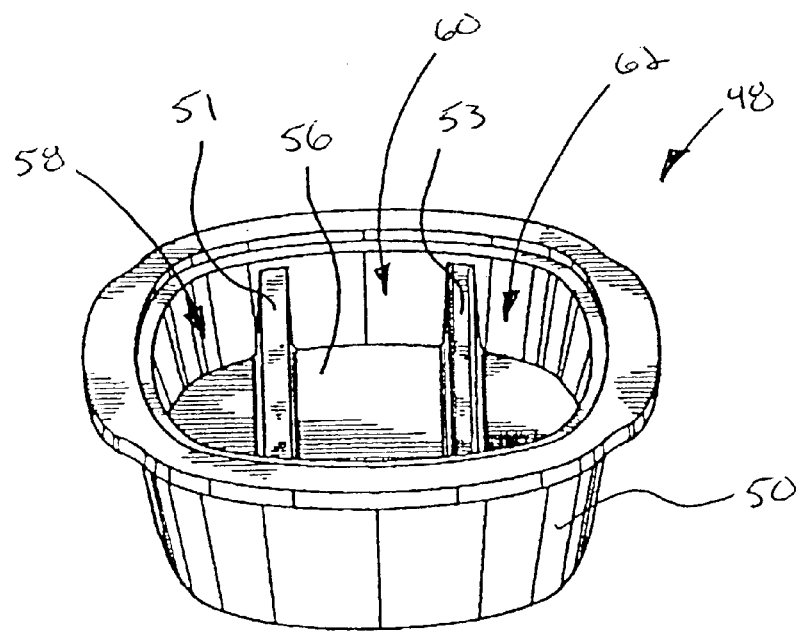
FIG. 7 is a second alternative embodiment of a food-heating appliance having a cooking unit with two medial walls according to the present invention.

As shown in FIG. 7, a second alternative embodiment shows an oval cooking unit 48 having a bottom 56 and a sidewall 50. A first and second medial sidewall, 51 and 53 respectively, project upwardly from the bottom 56 and inwardly from the sidewall 50 creating first, second and third cooking subchambers, 58, 60 and 62, respectively.

As shown in FIG. 8, a third alternative embodiment shows a heating unit 64 with a bottom 66 and preferably a continuous sidewall 68 having an oval cross-section. The bottom 66 and sidewall 68 define a heating chamber 70 and the sidewall 68 defines an annular lip 72 at an upper edge of the sidewall 68. The heating chamber 70 has an asymmetrical coil-type heating element 74 disposed therein and mounted to the heating unit 64. More specifically, a portion 76 of the element 74 is disposed on a portion of the sidewall 68 that is not disposed on an opposite portion of the sidewall 68. This advantageously allows for heating one end of the heating chamber 70 to a higher temperature than the opposite end. This arrangement will cause the food item in the cooking subchamber 36 to receive more heat than the food item in the cooking subchamber 34. The heating element 74 has a control switch 76 circuited to supply electricity thereto. Of course, separate controls may be provided to supply electricity to one or both the element 74 or the portion 76.

As shown in FIG. 9, a fourth alternative embodiment shows a heating unit 78 with a bottom 80 and preferably a continuous sidewall 82. The bottom 80 and sidewall 82 define an oval heating chamber 84. A hot-plate type heating element 86, such as a flat coil-shaped element, is disposed within the heating chamber 84 and mounted to the heating unit 78. The heating element 86 has a control switch 88 circuited to supply electricity thereto.

Figure 10:
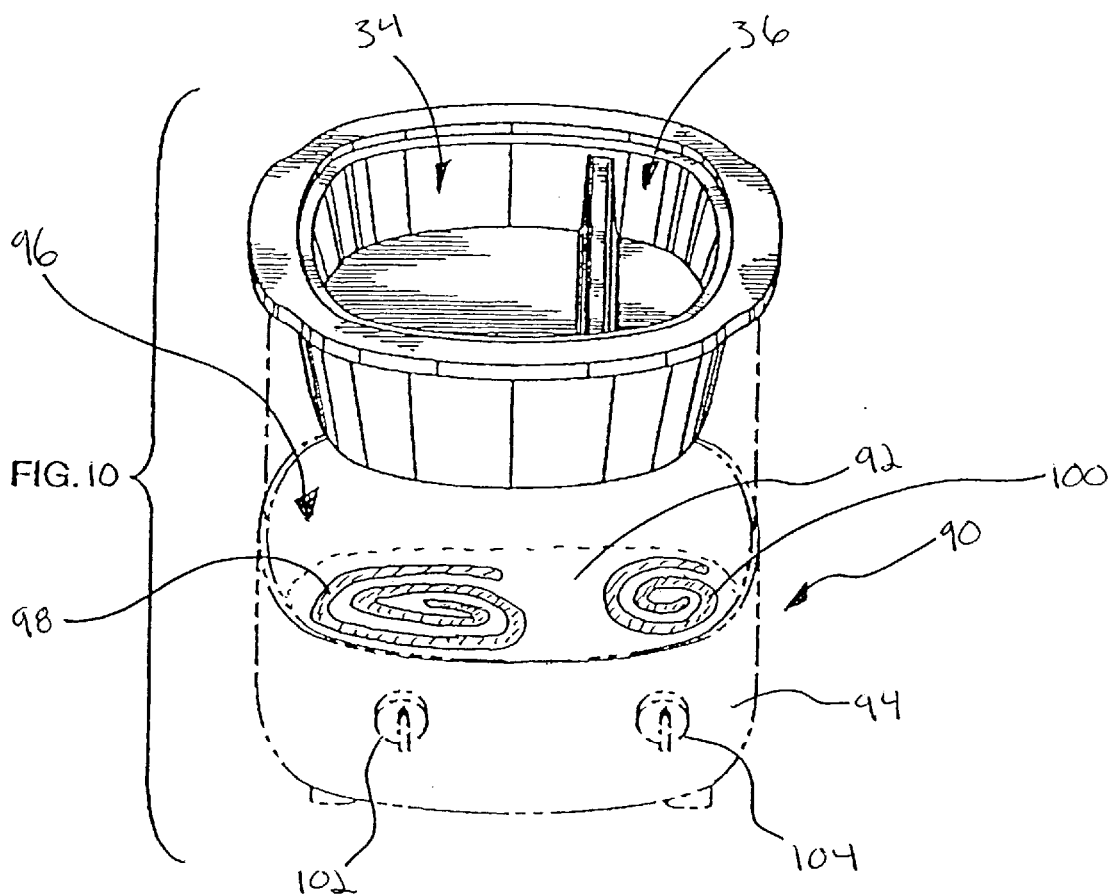
FIG. 10 is a fifth alternative embodiment of a food-heating appliance having a heating unit with a plurality of hot plate heat mechanisms according to the present invention.

As shown in FIG. 10, a fifth alternative embodiment shows a heating unit 90 with a bottom 92 and preferably a continuous sidewall 94. The bottom 92 and sidewall 94 define an oval heating chamber 96. A first and second hot-plate type heating element, 98 and 100 respectively, is disposed within the heating chamber 96 and mounted to the heating unit 90. The heating elements 98 and 100 each have a control switch, 102 and 104 respectively, circuited to supply electricity thereto. This advantageously allows for heating one end of the heating chamber 92 to a different temperature than the opposite end. Thus, the cooking subchamber 36 can be configured to receive more heat than the cooking subchamber 34.

Figure 11:
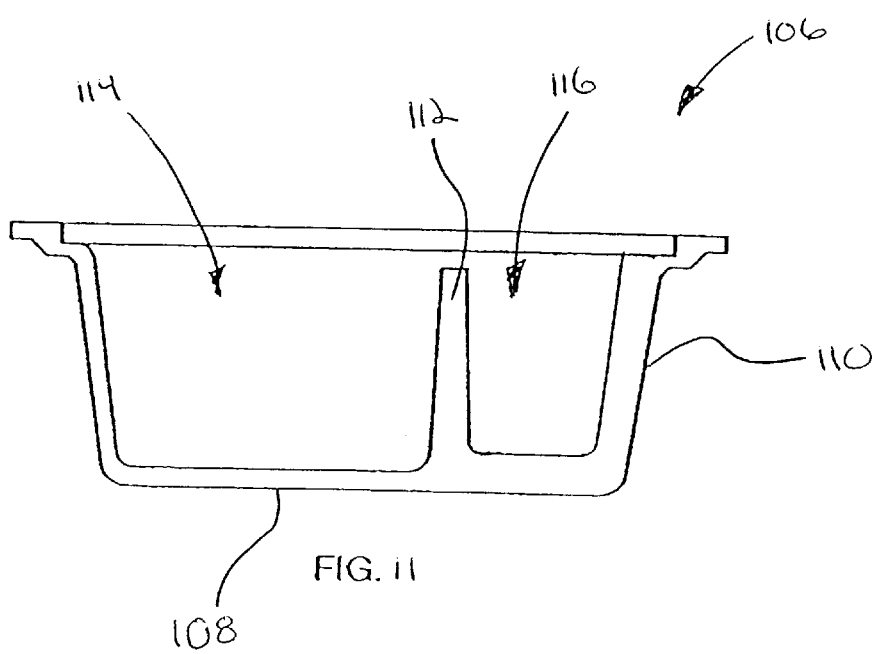
FIG. 11 is a sixth alternative embodiment of a food-heating appliance having a cooking unit having subchambers with varying wall thicknesses.

As shown in FIG. 11, a sixth alternative embodiment shows a cooking unit 106 having a bottom 108 and a sidewall 110 with a substantially oval cross-section. A medial sidewall 112 projects upwardly from the bottom 108 and inwardly from the sidewall 110 creating first and second cooking subchambers, 114 and 116, respectively. The wall thickness of cooking subchamber 114 is a predetermined degree thinner than the wall thickness of cooking subchamber 116. The varied wall thickness and the variation in the heat-retaining and insulative properties associated therewith advantageously allows the food product disposed in subchamber 116 to be heated a predetermined degree slower than the food product disposed in subchamber 14.

In use, the heating unit 12 is provided with a first cooking unit having a single heating chamber. A first type of food may be cooked in the cooking unit if so desired. The single chamber cooking unit is removed and a second cooking unit 14, having a plurality of cooking subchambers, is inserted into the heating unit 12. Having a heating unit 12 with interchangeable cooking units advantageously allows the user to slow-cook and serve a multiplicity of food products without having to purchase multiple heating units 12. Thus, the user may desire to purchase different types of cooking units, including those according to the present invention, to utilize with a single heating unit 12. Moreover, a first type of food can be cooked in the first subchamber while a second type of food is cooked in the second subchamber, which also may reduce the number of cooking units 14 that must be used.

While the preferred embodiments of the present invention have been described, it should be understood that various changes, adaptations and modifications might be made without departing from the spirit of the invention and the scope of the appended claims. For example, the medial wall or walls that divide the cooking subchambers may be straight, as depicted, or curved. Furthermore, the medial wall or walls may include one or more bends to create a portion of the medial wall that extends at an angle to a sidewall of the cooking unit.

What is claimed is:

1. A food-heating appliance comprising:
 a heating unit defining a heating area, the heating area including at least one heating element mounted thereto and adapted to supply heat to the heating area, and a control switch circuited to supply electricity to; and a ceramic cooking unit having a bottom and at least one sidewall upstanding therefrom, the bottom and sidewall defining a cooking chamber adapted to be at least partially received over the heating area, the cooking unit having at least one medial wall upstanding from the bottom wall within the cooking chamber defining at least a first and second cooking subchamber, wherein the heating element supplies heat to the cooking unit via the heating area to heat the first and second cooking subchambers and the heating element supplies heat asymmetrical to the respective first and second cooking subchambers.

2. The food-heating appliance according to claim 1 wherein the cooking unit has a plurality of medial walls upstanding from the bottom wall within the cooking chamber defining a plurality of cooking subchambers.

3. The food-heating appliance according to claim 1 wherein the heating unit includes a bottom and at least one sidewall upstanding therefrom to define the heating area, said sidewall defining an annular lip around the top of the heating area;

said cooking chamber of said cooking unit defining an annular lip along the top edge of said sidewall, said annular lip of said cooking unit being positionable over the annular lip of the heating unit.

4. The food-heating appliance according to claim 1, wherein the first and second subchambers have respective first and second wall thicknesses, wherein the first wall thickness is different than the second wall thickness.

5. The food-heating appliance according to claim 4 wherein the heating unit heats the first and second subchambers asymmetrically.

6. A ceramic cooking unit adapted to be at least partially received in an electric heating unit, comprising:

first and second subchambers adapted for receiving heat asymmetrically from the heating unit.

7. The cooking unit according to claim 6, wherein the first and second subchambers have respective first and second wall thicknesses, wherein the first wall thickness is different than the second wall thickness.

8. An electric heating unit adapted to receive at least a portion of a ceramic cooking unit having first and second subchambers, comprising:

first and second heating elements adapted for applying heat asymmetrically to the first and second subchambers.

9. The electric heating unit according to claim 8, further comprising first and second control switches that control the respective first and second heating elements.

10. A food-heating appliance, comprising:

a heating unit having a bottom and at least one sidewall upstanding therefrom, the bottom and sidewall defining a heating chamber, and the sidewall defining an annular lip around the top of the chamber, the chamber including at least one heating element mounted thereto and adapted to supply heat to the chamber, and a control switch circuited to supply electricity to the heating element, wherein the heating element supplies heat asymmetrically to the respective first and second cooking subchambers;

a cooking unit having a bottom and at least one sidewall upstanding therefrom, the bottom and sidewall defining a cooking chamber adapted to be at least partially received within the heating chamber and the sidewall defining an annular lip positionable over the annular lip of the heating unit, the cooking unit having at least one medial wall upstanding from the bottom wall within the cooking chamber defining a first and second cooking subchamber; and wherein the heating element supplies heat to the cooking unit via the heating chamber to heat the first and second cooking subchambers.

11. A method of using a food-heating appliance having a heating unit with a bottom and a sidewall upstanding therefrom defining a heating chamber therein with a heating element attached thereto, a first cooking unit having a bottom with a sidewall upstanding therefrom defining a cooking chamber therein, and a second cooking unit having a bottom and at least one sidewall upstanding therefrom defining a cooking chamber therein adapted to be at least partially received within the heating unit, the second cooking unit having at least one medial wall upstanding from the bottom forming first and second cooking subchambers thereby, said method comprising:

inserting the first cooking unit at least partially within the heating unit, wherein the heating element supplies heat asymmetrically to the respective first and second cooking subchambers;

removing the first cooking unit from the heating unit;

inserting the second cooking unit at least partially within the heating unit; and heating the second cooking unit via the heating unit.

12. The method of claim 11 further comprising:

cooking a first type of food in the first subchamber and a second type of food in the second subchamber of the second cooking unit.

13. The method of claim 12 further comprising:

heating a third type of food in the first cooking unit prior to removing the first cooking unit.

\* \* \* \* \*

UNITED STATES PATENT AND TRADEMARK OFFICE
CERTIFICATE OF CORRECTION

PATENT NO. : 6,259,068 B1
DATED : July 10, 2001
INVENTOR(S) : Mary K. Barrow

It is certified that error appears in the above-identified patent and that said Letters Patent is hereby corrected as shown below:

Claim 1,
Line 5, delete "electricity to;" and substitute -- electricity to the heating element; -- in its place.

Signed and Sealed this

Ninth Day of April, 2002

Attest:

JAMES E. ROGAN
Attesting Officer          Director of the United States Patent and Trademark Office